United States Patent [19]

Hanig et al.

[11] Patent Number: 4,974,683
[45] Date of Patent: Dec. 4, 1990

[54] RIDGE TILLAGE ATTACHMENT FOR PLANTERS

[75] Inventors: John Hanig; Edward H. Smit, both of Sheffield; Steven E. Sukup, Dougherty; James D. Tuttle,, all of Iowa

[73] Assignee: Sukup Manufacturing Company, Sheffield, Iowa

[21] Appl. No.: 438,940

[22] Filed: Nov. 16, 1989

Related U.S. Application Data

[63] Continuation of Ser. No. 139,985, Dec. 31, 1987, abandoned.

[51] Int. Cl.⁵ ................... A01B 39/08; A01B 39/14
[52] U.S. Cl. .................................. 172/156; 172/310; 172/624.5; 172/26; 172/705; 111/52
[58] Field of Search ............. 172/310, 624.5, 26, 172/705, 156, 313, 140, 504, 184, 187, 159, 574, 545; 111/52, 85, 63, 66, 59

[56] References Cited

U.S. PATENT DOCUMENTS

| | | |
|---|---|---|
| 2,318,205 | 5/1943 | Drennan . |
| 2,644,381 | 7/1953 | Kamplade ............... 172/624.5 |
| 2,975,844 | 3/1961 | Oehler et al. . |
| 3,203,487 | 8/1965 | Whitesides ............... 172/624.5 |
| 3,233,680 | 2/1966 | Arzoian et al. . |
| 3,362,361 | 1/1966 | Morrison . |
| 3,433,307 | 3/1969 | Gilbert . |
| 3,450,074 | 6/1969 | Gatzke et al. . |
| 3,611,956 | 10/1971 | Moore et al. . |
| 3,708,019 | 1/1973 | Ryan .................. 172/624.5 |
| 3,749,357 | 7/1973 | Clayton et al. . |
| 3,845,035 | 11/1974 | Koronka et al. . |
| 4,004,640 | 1/1977 | Bland ................... 111/52 |
| 4,054,007 | 10/1977 | Moore ................ 172/624.5 |
| 4,116,140 | 9/1978 | Anderson et al. . |
| 4,126,190 | 11/1978 | Wylie ................. 172/624.5 |
| 4,141,302 | 2/1979 | Morrison ................. 111/52 |
| 4,262,752 | 4/1981 | Parish . |
| 4,413,685 | 11/1983 | Gremelspacher et al. . |
| 4,461,355 | 7/1984 | Peterson ............... 172/624.5 |
| 4,520,876 | 6/1985 | Peterson ................ 172/538 |
| 4,553,607 | 11/1985 | Behn .................. 172/624.5 |
| 4,577,568 | 3/1986 | Netsch ................... 172/776 |
| 4,702,323 | 10/1987 | Smit et al. .............. 172/156 |
| 4,766,962 | 8/1988 | Frase .................. 172/624.5 |

FOREIGN PATENT DOCUMENTS 598547 9/1925 France ................ 172/624.5

OTHER PUBLICATIONS

Article entitled, "New John Deere 720", from Jan. 1986, issue of *Iowa Farmer Today*.
Article entitled "New John Deere 720 Ridge Till Attachment" from the *Iowa Farm Bureau Spokesman* of Mar. 1, 1986.
Advertising Literature of Alloway, a Subsidiary of Rau of Fargo, N.D., 11-1985.
Article entitled "Ridge Hugging Planter" by Bill Gergen in Dec. 1984 issue of FIN.
Article entitled "Build Your Own No-Till Drill" from Farm Show, vol. 7, No. 6 (1983).
Article entitled "Make Your Planter a Ridge Planter" by Bill Gergen from Feb. 1985 issue of FIN.
Article entitled "Ridging on 22-Inch Rows—Precision Row Guidance Makes This High Yield, Low Cost System Possible."
Article entitled "New John Deere 720 Ridge Till Attachment" from the *Iowa Farmer Today*.

(List continued on next page.)

*Primary Examiner*—Richard J. Johnson
*Attorney, Agent, or Firm*—Neuman, Williams, Anderson & Olson

[57] ABSTRACT

A ridge tillage attachment includes springs associated with a linkage which guides a tool and wheel support beam for vertical movement, the springs being mounted within the linkage envelop to provide a compact arrangement and being operative to apply required forces to to a tool and wheels carried by the beam, while facilitating disassembly of the attachment when desired. The attachment also includes a structure which securely connects wheel axles to the support beam with a clamping action while being adjustable to provide a large range of relative positional values.

24 Claims, 3 Drawing Sheets

OTHER PUBLICATIONS

Article entitled, "Shaving the Top of the Ridges Beats No-Tilling into Them", from the Mar. 1986 issue of *Successul Farming*.

Article entitled "Ridge Till Saved Three Ton Soil/Acre", in the Sep. 1, 1984 issue of *Prairie Farmer*.

Article entitled "Ridges on the Contour Stop Erosion", from the Apr. 1986 issue of *Farm Journal*.

Article entitled "Ridge Tillage Soars in a Stagnant Economy", from Jan., 1986 issue of *Successful Farming*.

Article entitled "Forget Foxtail—Ridge Planting Can Help Keep This Weed Out of Beans for Good", by Dick and Sharon Thompson in the Jul./Aug. 1984 issue of the *New Farm*, pp. 18-20.

Article entitled "Reduced Till Planter", by Dave Nowitz in Feb. 1985 issue of *Successful Farming, Machinery Management* at pp. 19-25.

Articles entitled "Making Ridge Tillage Work", by Donna Prevedell from Jul. 1984 issue issue of *Progressive Farmer* at pp. 34 and 36.

Advertising literature entitled "Orthman Phase II Tracker Automatic Guidance Control System", Orthman Flex Hiller and Orthman Double Disk Furrow Opener of Orthman Mfg., Inc., Lexington, Nebr.

Advertising literature entitled "Ridge-Til", of Kelderman Mfg., Inc. of Oskaloosa, Iowa.

Advertising literature entitled "Trash Whipper Trash Cleaning System", of Acra-Plant Sales, Inc., Garden City, Kans.

Advertising literature entitled "Buffalo All-Flex Till Planter"of Buffalo Farm Equipment, Fleisher Manufacturing, Columbus, Nebr.

Advertisment for Orthman Phase II Tracker Automatic Guidance Control System of Orthman Manufacturing, Inc. of Lexington, Nebr.

Advertising literature entitled "Ridge Tilling for Ridge Farmers" of BH Manufacturing, Inc. of Odin, Minn.

Advertising literature entitled "Hiniker Econ-O-Till Cultivator", of Hiniker Company, Mankato, Minn.

Advertising literature entitled "Hiniker Econ-O-Till 3500/3800" of Hiniker Company, Mankato, Minn.

Advertising literature entitled "Buffalo Ridge Runner Till Plant Attachment" of Buffalo Farm Equipment, Fleisher Manufacturing, Columbus, Nebr.

Advertising literature entitled "Behn Ridge Systems, Inc." of Behn ridge Systems, Inc. of Boone and Madrid, Iowa.

Advertising literature entitled "the Ridge Hugger" of K and M Manufacturing Company of Renville, Minn. including a reprint from the Dec., 1984 issue of *Farm Industry News*.

Article from *Progressive Farmer* of Sep., 1984, entitled "Farmer Designs Ridge Planting Systems".

Operator's Manual for John Deere 7100 folding Max-Emerge Planter, p. 73.

Portion of parts catalog for John Deere 7100 folding Max-Emerge Integral Planter, dated Jan. 17, 1984.

Advertising literature of Behn Ridge Systems, Inc. of Boone, Iowa and Madrid, Iowa entitled "Behn Ridge Systems, Inc. Offers Two New and Unique Items for John Deere and International Planters".

John Deere Fundamentals of Machine Operation--Planting (1975), pp. 21, 27, 106.

RIDGE TILLAGE ATTACHMENT FOR PLANTERS

This application is a continuation of application Ser. No. 07/139,985 filed on Dec. 31, 1987 now abandoned.

BACKGROUND OF THE INVENTION

1. Field of the Invention

This invention relates to a ridge tillage attachment for planters and the like and more particularly to an attachment which has a compact construction and which is readily attached to row planter frame structures or the like of various configurations while providing very firm, reliable and secure support of tool units carried thereby. The attachment is readily connected to and detached from the frame structure and is relatively simple in construction and economically manufacturable.

2. Background of the prior art

The Smit et al. U.S. Pat. No. 4,702,323 discloses a ridge tillage attachment for conventional rowcrop planters, having a number of highly desirable features. The attachment includes a generally horizontal support beam having a rearward end connected through a parallelogram linkage support system to a pair of support members which may extend downwardly from a structural member of a support vehicle, such as a conventional planter tool bar. The forward end of the beam is connected to ground-engaging wheels which control the vertical position of the tool unit and which provide a guiding function, being so supported as to engage opposite sides of a ridge to be tilled in preparation for the planting of seeds in the crest of the ridges.

As disclosed in the Smit et al. patent, the forward end of the beam is connected to the wheels through an adjustable attachment which includes an inner casing member connected to the wheels and arranged for vertical telescopic movement within an outer casing an adjustment screw arrangement being provided for adjusting the relative vertical positions of the casings. To resiliently urge the tool and wheel means downwardly relative to the frame structure, a coiled compression spring is provided which surrounds a guide rod which extends between an intermediate portion of the beam and a mid-point of a transverse member which is secured between upper end portions of the vertically extending frame members. The axis of the spring is substantially vertical and is aligned with a point between cutting discs or rolling coulters which are operative to cut through debris in the center of the ridge. Thus the force of the spring is applied directly over such coulters. Nuts are threaded on the rod for adjustment of the pressure exerted by the spring.

SUMMARY OF THE INVENTION

This invention was evolved with the general object of providing an improved ridge tillage attachment for planters and more particularly with the object of providing a compact, rugged and highly reliable device for attachment to various types of planters and which is relatively simple, readily used and economically manufacturable.

Important aspects of the invention relate to the discovery and recognition of problems with attachments constructed in accordance with the Smit et al. patent. Although highly advantageous in many respects, it is found that there are problems with the spring arrangement in that it is difficult to avoid bottoming out of the spring. Also, it is found that the arrangement is such as to present interference problems with respect to certain types of planters and in addition, there are wear problems associated with sliding interengagement between the spring and the guide rod on which it is supported. With that arrangement, the spring must be quite long to allow the required movement of the tool unit which applying the proper force thereto.

Another problem relates to the looseness of the overall assembly, with a tendency to produce undue wear and stress of the component parts, especially when traveling over rough terrain.

In accordance with the invention, a support system is provided in which spring means are positioned in proximity to the beam and between the lower ends of the vertical support members to act on the linkage means and to exert a downward force on the beam. With this arrangement, the spring biasing system is within the envelope of the linkage and a compact assembly is provided, avoiding the interference problems with the components of various planters upon which the assembly may be mounted.

The arrangement of the invention has a number of other important advantages. In accordance with important features of the invention, tension spring means are provided which extend generally horizontally and which act between a linkage component and an intermediate portion of the beam, so acting as to exert a torque on the linkage component and to urge the beam downwardly relative to the frame structure. Preferably, the spring means comprises a pair of springs which are located along and on opposite sides of the beam. The springs are so arranged that they can be readily connected and disconnected when the tool structure is removed from the linkage components.

Further important features of the invention relate to the connection of the forward end of the beam to the wheel means. It was discovered that problems with looseness and wear problems with the prior construction result from the aforementioned arrangement in which an inner casing is telescopically arranged within an outer casing, especially when the inner casing is at or near the limit of its downward adjustable movement relative to the outer casing.

In accordance with the invention, an attachment means is provided in which the relative position of members may be readily adjusted to obtain optimum operation of the system and in addition, a clamping arrangement is provided to securely hold the members against relative tilting or other movements, once the desired adjustment has been achieved.

This invention contemplates other objects, features and advantages which will become more fully apparent from the following detailed description, taken in conjunction with the accompanying drawings.

DESCRIPTION OF A PREFERRED EMBODIMENT

Figure 1:
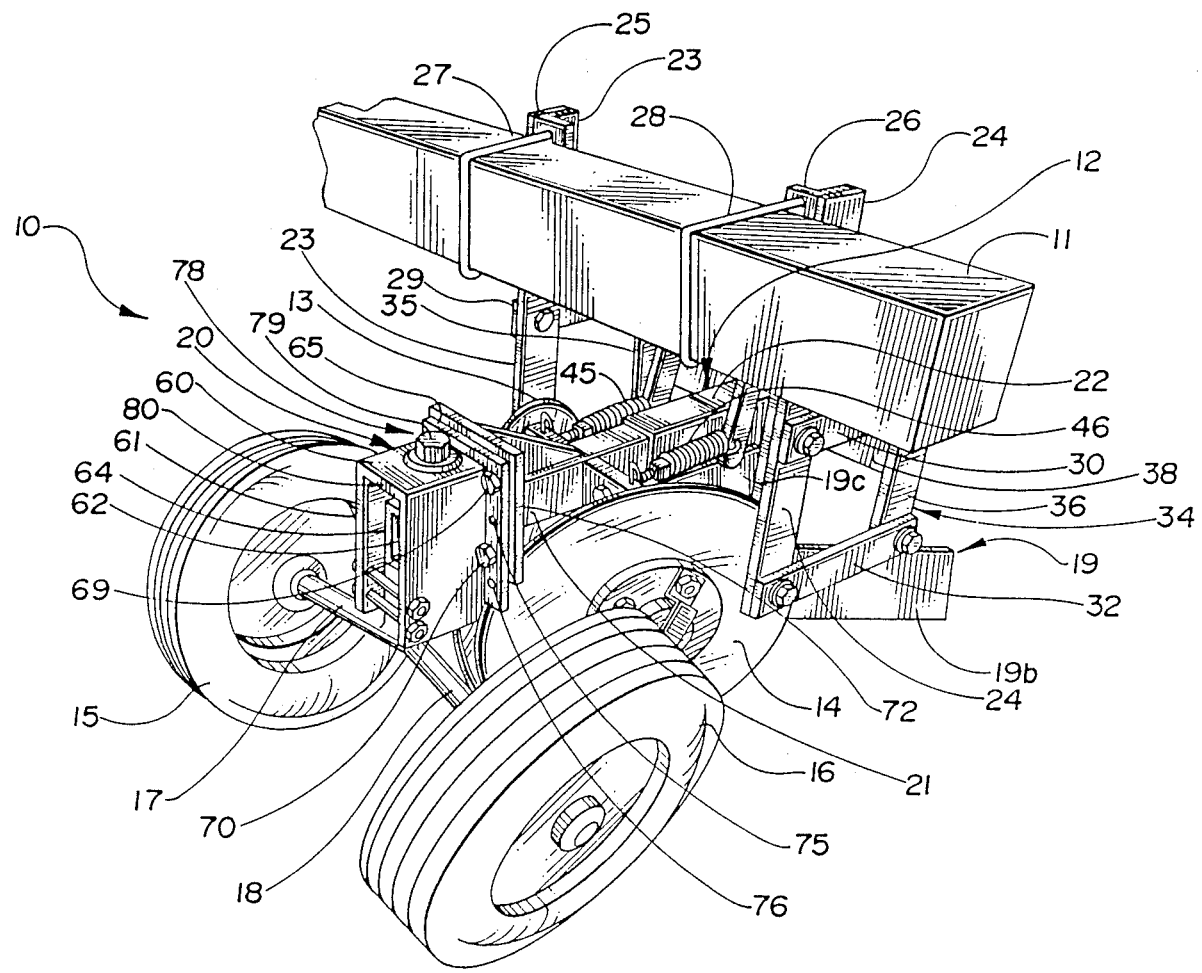
FIG. 1 is a perspective view of a ridge tillage attachment constructed in accordance with the invention looking at the attachment from a position in front and to one side thereof.
Figure 2:
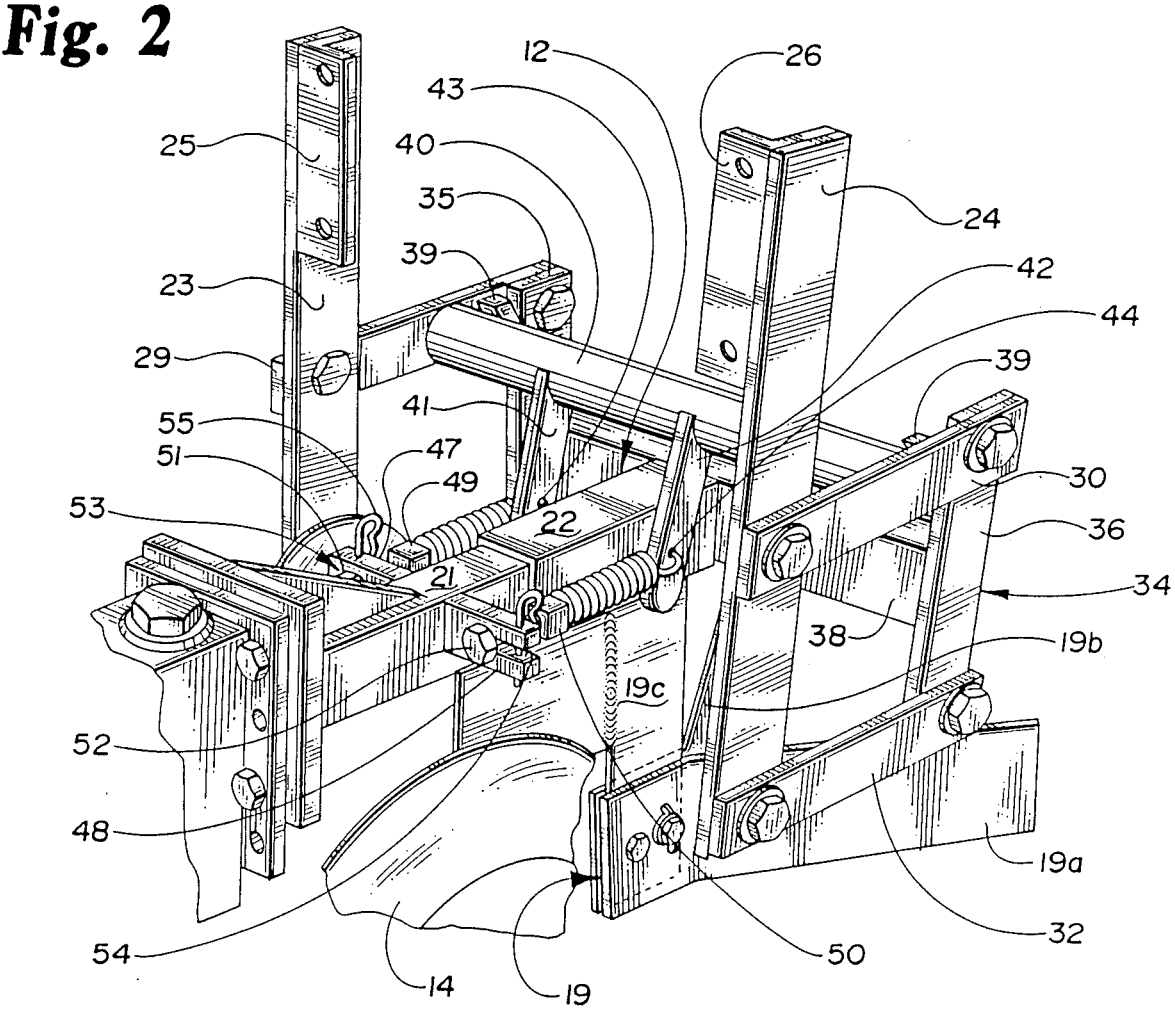
FIG. 2 is a perspective view looking from a position similar to that of FIG. 1, but at only a portion thereof, with parts broken away to provide a clearer showing of a beam support linkage and spring arrangement of the invention.
Figure 3:
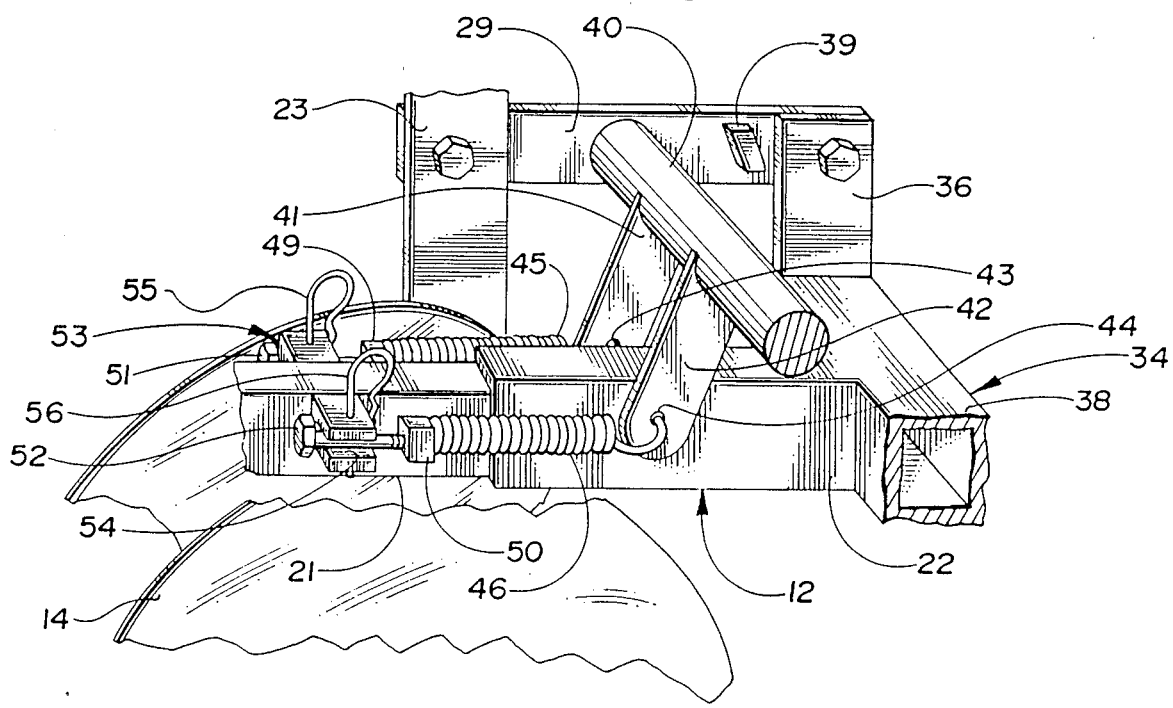
FIG. 3 is view of the structure shown in FIG. 2, but with a side perspective, to better show the relationship of components of the system.

Reference numeral 10 generally designates a ridge tillage attachment for planters which is constructed in accordance with the principles of this invention. The general construction of the illustrated attachment is similar to the construction of the attachment as disclosed in the aforementioned Smit et al. U.S. Pat. No. 4,702,323, the disclosure of which is incorporated by reference.

In general, the attachment 10 may be secured to a horizontal tool bar 11 of a planter, along with other attachments of the same construction, each attachment being designed to move along a ridge into which seeds are to be planted. The illustrated attachment 10 includes a beam 12 which rotationally supports a pair of cutting discs or rolling coulters 13 and 14, preferably with the axis of one offset forwardly relative to that of the other. Coulters 13 and 14 are operative to cut through any debris along the center of the ridge and to spread residue and soil to open a shallow furrow along the crest of the ridge.

A pair of wheels 15 and 16 are supported on axles 17 and 18 which are secured to the forward end of the beam 12. The wheels operate to control the vertical position of the coulters 13 and 14 as well as to guide or steer the attachment along the ridge. The axles 17 and 18 are canted so that the wheels 15 and 16 may roll freely along the oppositely inclined sides of the ridge.

A sweep device 19 is shown positioned behind the coulters and functions to clear away soil and debris which have been initially cut and spread by the coulters 13 and 14. The illustrated deVice 19 includes a pair diverging blade portions 19a and 19b and is connected to the rear of the beam 12 through a mounting plate portion 19c.

Important features of the invention relate to an adjustable assembly 20 for securing the axles 17 and 18 to the forward end of the beam 12. As hereinafter described, the assembly 20 is such as to permit adjustment to any desired position within a wide range while providing a firm and very secure and reliable connection between the axles 17 and 18 and the beam 12.

The beam 12 is preferably formed in two sections which can be taken apart, for partial disassembly of the attachment. A forward section 21 is telescopingly supported in a rearward section 22, the two sections being secured together with a removable bolt or pin after being assembled. The coulters 13 and 14 and the wheels 15 and 16 are secured to the forward section 21 so that upon disassembly, only the rear section 22 and supporting linkage components remain supported by the tool bar 11. Such components include a pair of transversely spaced vertical members 23 and 24 which have upper end portions secured to the tool bar 11. As shown, the members 23 and 24 are bolted to angle iron members 25 and 26 which are secured to the bar 11 by U-bolts 27 and 28. It will be understood that other means may be employed to secure the members 23 and 24 to a tool bar or other frame structure of the supporting vehicle and it is a feature of the invention that there is nothing to interfere with mounting the attachment on planters having various types of construction.

Two link means are formed by two pairs of links which have forward ends secured to lower portions of the vertical members 23 and 24 in a parallelogram type of arrangement. As shown, an upper pair of links 29 and 30 and a lower pair of links 31 and 32 are provided. The forward ends thereof are pivotally secured to the vertical members 23 and 24 and the rearward ends thereof are pivotally secured to a beam-support member 34 which has a generally H-shaped configuration, including a vertical portion 35 connecting the rear ends of links 29 and 31, a second vertical portion 36 connecting the rear ends of links 30 and 32 and a horizontal portion 38 extending transversely between intermediate parts of the vertical portions 35 and 36. The rear section 22 of the beam 12 is welded or otherwise rigidly secured to a central part of the horizontally extending portion 38 of the beam support link 34.

A transverse bar 40 has opposite ends which are welded or otherwise secured to center portions of the upper links 29 and 30 and, together with the transverse portion 38 of the link 34, acts as a stabilizer and to resist pivotal movement of the beam 12 about its longitudinal and horizontal transverse axes. The bar 40 may also function as a torsion bar to transmit downward torque force to the linkage from springs 45 and 46 as described further below. When the beam 12 is disassembled by removing the forward section 21 and the coulters and wheels connected thereto, stop studs 39 affixed on the links 31 and/or 32 engage the vertical links 35, 36 to limit downward relative movement of the links. These limit stops also provide for lifting of the tool beam 12 and the attached components (wheels, coulters and sweeps) when the planter is raised, i.e. by lifting of tool bar 11.

In accordance with the invention, a pair of arms 41 and 42 are welded or otherwise rigidly secured to the torsion bar 40 and extend downwardly to terminal ends which have openings 43 and 44 which receive the rearward ends of a pair of coiled tension springs 45 and 46. The forward ends of springs 45 and 46 are connected to a pair of stub arms 47 and 48 which project out from opposite sides of the forward section 21 of the beam 22. Preferably, the forward ends of the springs 45 and 46 are secured to a pair of connector members 49 and 50 and a pair of adjustment bolts 51 and 52 are provided which have end portions threaded into the connector members 49 and 50, with shank portions of the bolts 51 and 52 being inserted into slots 53 and 54 in the stub arms 47 and 48. Then, straight pin portions of a pair of wire-formed cotters or keepers 55 and 56 are inserted downwardly through aligned openings in the outer ends of the arms 47 and 48 to prevent removal of the bolts 51 and 52. The keepers 55 and 56 have configurations as shown, such as snap into place and to be removable by applying upward pulling forces thereto. Thereby, the springs may be detached readily when disassembling the attachment.

Figure 4:
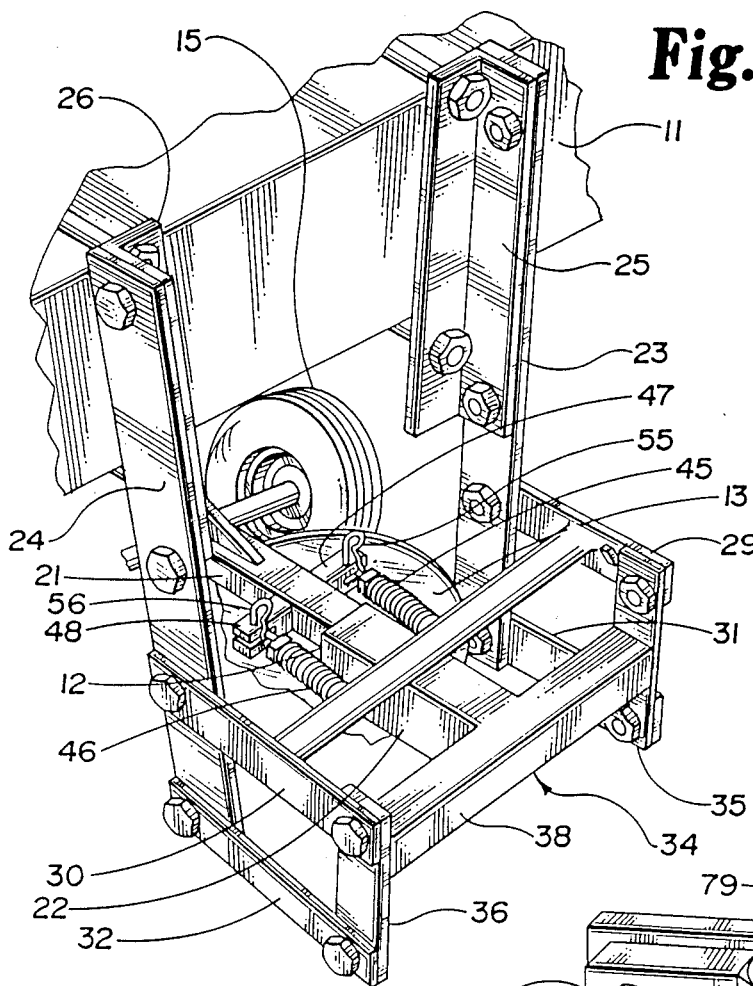
FIG. 4 is a rear perspective view of portions of the attachment.
Figure 5:
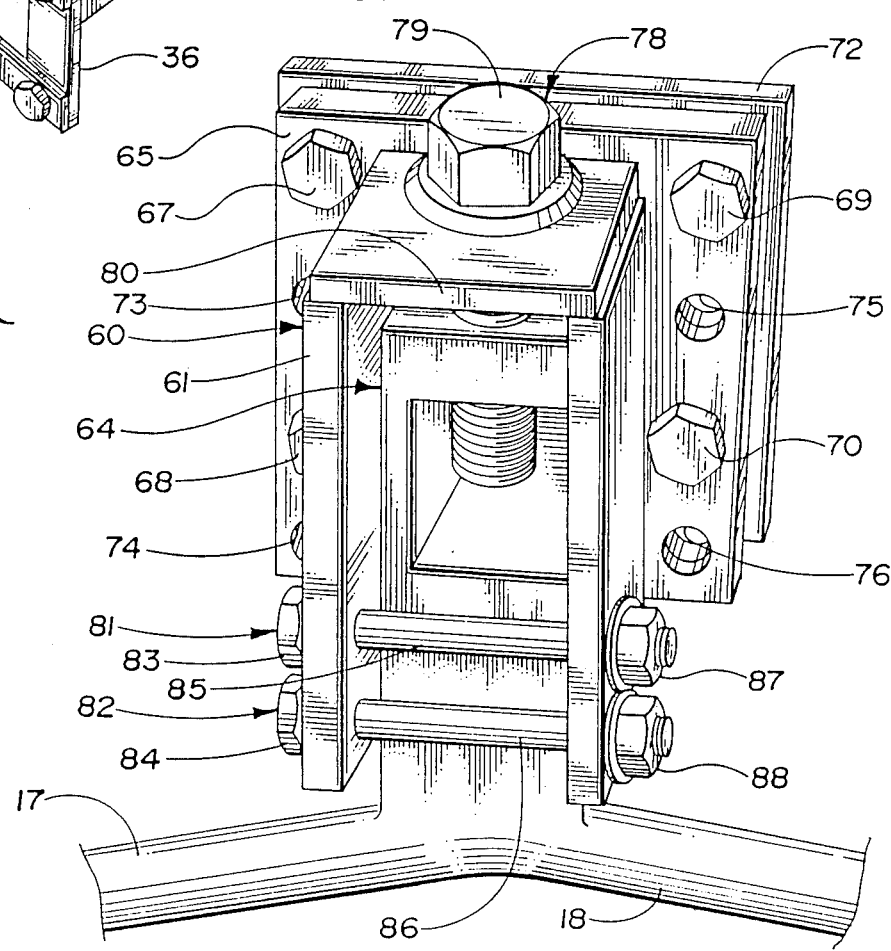
FIG. 5 is a front perspective view of an adjustable assembly on the forward end of the attachment, constructed in accordance with the invention.

In operation, the springs 45 and 46 exert rearward forces on the stub arms 47 and 48 of the beam 12 and forward forces on the lower ends of the arms 41 and 42. The rearward forces exerted on the beam 12 through the stub arms 47 and 48 have a relatively small direct effect on the beam when the links 29–32 are in generally horizontal positions as shown. However, forces are exerted forwardly on the lower ends of the arms 41 and 42, components of such forces being applied along lines spaced from the axis of pivotal movement of the links 30 and 32 relative to the support members 23 and 24 and to thereby apply a torque to the links 30 and 32, in a clockwise direction as viewed in FIG. 4. As a result a substantial downward force is exerted on the rear transverse link 34 and thereby on the beam 12 secured thereto.

The geometry is such that with the relatively short and compact springs 45 and 46 as shown and without excessive stressing thereof, a downward force of large magnitude is exerted throughout a large range of vertical movement of the beam 12. By way of illustrative example, and not by way of limitation, each of the springs 45 and 46 may be formed of 0.208 inch diameter wire and may have an outside diameter of 1.5 inches, with 18 coils and a free length of 5.5 inches. With two springs, a force of on the order of 100 pounds per inch of elongation might be exerted, after taking into account the effect of plug portions of the connector members 49 and 50 which extend into the springs 45 and 46 and cause about three coils of each to be inactive. Each of the upper and lower links 29–32 may have an effective length of about 7 inches and the rear link 34 may have an effective length of about 6 inches, other dimensions may have proportions as illustrated. With such dimensions and with the geometry as illustrated, the angle of application of the forces is such that the springs only stretch about 0.6 inches per inch of vertical movement of the beam 12 and the applied force is about 60 pounds per inch of movement.

The adjustable assembly 20 comprises a member 60 which includes spaced wall portions 61 and 62 to define a vertically extending channel therewithin and a member 64 disposed between the wall portions 61 and 62. In the illustrated arrangement, the lower end of the member 64 is welded or otherwise rigidly secured to the axles 17 and 18. A carrier plate 65 is secured to or integral with the member 60 and is secured by bolts 67–70 to a mounting plate 72 which is secured to the forward end of the forward section 21 of the beam 12. As shown, the carrier plate has four bolt holes 73–76 which are selectively usable instead of the holes through which the shanks of the bolts 67–70 extend in the position as illustrated, so as to obtain two selected positions of vertical adjustment of the member 60 relative to the beam 12. After tightening of the bolts 67–70, the member 60 is securely and fixedly connected to the beam 12. Additional bolt holes may be provided to obtain additional positions of adjustment, if desired.

An adjustment screw 78 is provided for obtaining any desired position of the member 64 relative to the member 60, within a certain range, the screw 78 having a head portion 79 which is engageable by an adjustment wrench. A shank portion of the screw 78 extends through a top wall portion 80 of the member 60 and has a lower end portion threaded into the axle support member 64. A collar is disposed on an intermediate position of the shank portion, below the wall portion 80, to limit vertical displacement relative thereto. Accordingly, the vertical adjustment of the wheels relative to the beam 12 and related implements may be effected by the gross incremental relative positioning of plates 65 and 72 and the vernier adjustment of the threaded mechanism 78. A wide range of vertical adjustments is available with a relatively short stroke of the threaded mechanism.

A very important feature relates to clamping of the member 64 between the wall portions 61 and 62 to securely fix the relative positions of the members 64 and 60 after adjustment. In the illustrated arrangement two bolts 81 and 82 are provided, having heads 83 and 84 and having shanks 85 and 86 extending through lower ends of the wall portions 61 and 62.

Nuts 87 and 88 are threaded on the ends of the shanks 85 and 86 and are tightened by wrench after adjustment of the position of member 64 to draw the wall portions 61 and 62 into tight frictional engagement with the member 64. The spacing of the wall portions 61 and 62 in the unstressed condition thereof is preferably only large enough to permit adjustment of the relative vertical positions of the members 60 and 64 and small enough to permit the wall portions 61 and 62 to be quite thick, as shown, while being capable of being drawn by the clamp bolts into very tight frictional engagement with the member 64 and to securely hold the axles 17 and 18 to the beam 12.

It will be understood that modifications and variations may be effected without departing from the spirit and scope of the novel concepts of the invention.

We claim:

1. A support system for connection to a frame structure of a row planter or the like to support a tool unit for movement in a path parallel to a generally horizontal path of movement of the frame structure while allowing resiliently restrained generally vertical movement of the tool unit relative to the frame structure, said system comprising; ground-engaging wheel means associated with said tool unit, a generally horizontal support beam, means for connecting said beam to said tool unit and said ground-engaging wheel means, a linkage system connecting said beam to the planter frame structure and arranged to guide said beam for generally vertical movement of said tool unit and said ground-engaging wheel means relative to said frame structure, and tension spring means disposed in proximity to said beam and arranged for acting on said linkage means to resiliently urge said beam and said tool unit and wheel means downwardly relative to said frame structure, said linkage system comprising a pair of generally vertical support members having lower end portions on opposite sides of said beam, a beam-support member rigidly connected to said support beam, a pair of first links and a pair of second links connecting said beam-support member to said lower portions of said vertical support members, and spring connection means connecting said first pair of links and said spring means, at a point such that said spring means operates to apply a downward force of large magnitude throughout a wide range of vertical movement of said support beam and said spring means being connected to said beam and being arranged to apply a force in a direction generally parallel to said support beam.

2. A support system as defined in claim 1, said spring means including a pair of springs located along opposite sides of said support beam.

3. A support system as claimed in claim 2, said springs being connected to said spring connection means at a point intermediate said first and second links.

4. A support system as defined in claim 3, wherein said spring connection means connect first ends of said springs to said first link at a first connection point and connect opposite second ends of said link to said beam at a second connection point, whereby said springs directly apply at said second connection point a force to said beam having a vertical component when said second connection point is vertically offset from said first connection point.

5. A support structure as defined in claim 1 wherein said first link comprises a pair of link members disposed on opposite sides of said beam, and a bar rigidly attached between said link members to provide stability to said linkage system and wherein said spring connection means includes a pair of arms extending from said bar.

6. A support system for connection to a frame structure of a row planter or the like to support a tool unit for movement in a path parallel to a generally horizontal path of movement of the frame structure while allowing resiliently restrained general vertical movement of the tool unit relative to the frame structure, said support system comprising: a support beam extending along an axis parallel to said horizontal path of movement, ground-engaging wheel means associated with said unit, adjustable attachment means between the forward end of said beam and said ground-engaging wheel means, linkage means connecting a rearward end portion of said beam to the frame structure and arranged to allow generally vertical movement of said tool unit and wheel means relative to said frame structure, spring means for acting on said linkage means to resiliently urge said tool unit downwardly relative to said frame structure, said adjustable attachment means being arranged for adjustment to adjust the relative vertical position of said wheel means relative to said forward end of said beam, and clamp means associated with said adjustment means and arranged for operation after adjustment of said adjustment means to fixedly and securely hold said wheel means against movement relative to said beam means, said adjustment means comprising a first member which defines a vertically extending channel therewithin, a second member disposed in said channel, means securing said wheel means to one of said first and second members, means securing the forward end of said beam to the other of said first and second members, said first member having wall portions on opposite sides of said second member, and said clamp means being arranged for drawing said wall means together after adjustment of the relative vertical positions of first and second members to press said wall portions into tight frictional engagement with said second member and effect a substantially rigid connection between said members, and said securing means between the forward end of said beam and the other of said firs and second members comprising a vertical mounting plate secured to said beam, a carrier plate secured to said other of said first and second members, and bolt means for securing said carrier plate to said mounting plate, at least one of said plate having a plurality of vertically spaced bolt holes for selective use to provide a plurality of adjusted relative vertical positions of said plates.

7. A support system for connection to a frame structure of a row planter or the like to support a tool unit for movement in a path parallel to a generally horizontal path of movement of the frame structure while allowing resiliently restrained generally vertical movement of the tool unit relative to the frame structure, said system comprising: ground-engaging means associated with said tool unit, a generally horizontal support beam, means for connecting said beam to said tool unit, a linkage system connecting said beam to the planter frame structure and arranged to guide said beam for generally vertical movement of said tool unit relative to said frame structure, and tension spring means disposed in proximity to said beam and arranged for acting on said linkage means to resiliently urge said beam and said tool unit downwardly relative to said frame structure, said linkage system comprising a pair of generally vertical support members having lower end portions on opposite sides of said beam, a support structure rigidly connected to said beam and having a first end portion and a second end portion, a pair of first links each pivotally connected about first horizontal axes at a first end to the first end portion of said support structure and at a second end to said lower end portions of said vertical support members, a pair of second links each pivotally connected to said lower end portions of said vertical support members and to the second end portion of said support structure about second horizontal axes parallel and in vertically spaced relation to said first horizontal axes to guide said beam for movement in a generally vertical path, and spring connection means for connecting said first links and said spring means at a point such that said spring means operates to apply a downward force of large magnitude throughout a wide range of vertical movement of said beam wherein said spring connection means comprises a bar rigidly attached between said first pair of links at a point intermediate said first horizontal axes to provide stability to said linkage system and at least one lever member which is rigidly attached to and extends from said bar.

8. The invention as in claim 7 wherein said lever member extends downward from said bar perpendicular to said first links.

9. A support system for connection to a frame structure of a row planter or the like to support a tool unit for movement in a path parallel to a generally horizontal path of movement of the frame structure while allowing resiliently restrained generally vertical movement of the tool unit relative to the frame structure, said system comprising: ground-engaging means associated with said tool unit, a generally horizontal support beam, means for connecting said beam to said tool unit, a linkage system connecting said beam to the planter frame structure and arranged to guide said beam for generally vertical movement of said tool unit relative to said frame structure, and tension spring means disposed in proximity to said beam and arranged for acting on said linkage means to resiliently urge said beam and said tool unit downwardly relative to said frame structure, said linkage system comprising a pair of generally vertical support members having lower end portions on opposite sides of said beam, a support structure rigidly connected to said beam and having a first end portion and a second end portion, a pair of first links each pivotally connected about first horizontal axes at a first end to the first end portion of said support structure and at a second end to said lower end portions of said vertical support members, a pair of second links each pivotally connected to said lower end portions of said vertical support members and to the second end portion of said support structure about second horizontal axes parallel and in vertically spaced relation to said first horizontal axes to guide said beam for movement in a generally vertical path, spring connection means for connecting said first links and said spring means at a point such that said spring means operates to apply a downward force of large magnitude throughout a wide range of vertical movement of said beam, and said spring means being connected to said beam and being arranged to apply a force in a direction generally parallel to said beam.

10. A support system for connection to a frame structure of a row planter or the like to support a tool unit for movement in a path parallel to a generally horizontal path of movement of the frame structure while allowing resiliently restrained generally vertical movement of the tool unit relative to the frame structure, said system comprising: ground-engaging means associated with said tool unit, a generally horizontal support beam, means for connecting said beam to said tool unit, a linkage system connecting said beam to the planter frame structure and arranged to guide said beam for generally vertical movement of said tool unit relative to said frame structure, and tension spring means disposed in proximity to said beam and arranged for acting on said linkage means to resiliently urge said beam and said tool unit downwardly relative to said frame structure, said linkage system comprising a pair of generally vertical support members having lower end portions on opposite sides of said beam, a support structure rigidly connected to said beam and having a first end portion and a second end portion, a pair of first links each pivotally connected about first horizontal axes at a first end to the first end portion of said support structure and at a second end to said lower end portions of said vertical support members, a pair of second links each pivotally connected to said lower end portions of said vertical support members and to the second end portion of said support structure about second horizontal axes parallel and in vertically spaced relation to said first horizontal axes to guide said beam for movement in a generally vertical path, and spring connection means for connecting said first links and said spring means at a point such that said spring means operates to apply a downward force of large magnitude throughout a wide range of vertical movement of said beam wherein said spring connection means connects the first end of said spring means to at least one of said first pair of links at a first connection point and connects the opposite second end of said spring means to said beam at a second connection point, whereby said spring directly applies at said second connection point a force to said beam having a vertical component when said second connection point is vertically offset from said first connection point.

11. A support system for connection to a frame structure of an agricultural implement to support a tool unit for movement in a path parallel to a generally horizontal path of movement of the frame structure while allowing resiliently restrained generally vertical movement of the tool unit relative to the frame structure, said system comprising: ground-engaging means associated with said tool unit, a support beam, means for connecting said beam to said tool unit, a parallelogram linkage system connecting said beam to said frame structure and arranged to guide said beam for generally vertical movement of said tool unit relative to said frame structure, and tension spring means disposed in proximity to said beam and arranged for acting on said linkage system to resiliently urge said beam and said tool unit in a vertical direction relative to said frame structure, said linkage system comprising a pair of generally vertical support members having lower portions adjacent said beam, vertical link means, a pair of first links each pivotally connected about first horizontal axes at a first end to said vertical link means and at a second end to said lower portions of said vertical support members, a pair of second links each pivotally connected to said lower portions of said vertical support members and to said vertical link means about second horizontal axes parallel and in vertically spaced relation to said first horizontal axes, a support structure rigidly connected to said beam and to vertically movable portions of said linkage system, a lever member rigidly attached to at least one of said first and second links, and spring connection means connecting said tension spring means in tension between a distal portion of said lever member and another portion of said support system and thereby applying a vertical positioning force on said linkage system and attached tool unit.

12. The invention as in claim 11 wherein said lever member projects within said linkage systems.

13. The invention as in claim 11 wherein said pair of first links are disposed above and parallel to said pair of second links, and said lever member is rigidly attached to said pair of first links and projects downwardly therefrom.

14. The invention as in claim 13 wherein said lever member and tension spring means are disposed within said linkage system.

15. The invention as in claim 14 wherein one end of said spring means is attached to said distal portion of said lever member and the other end thereof is attached to said support beam.

16. The invention as in claim 15 wherein said beam is positioned between the plane defined by said pair of first links and the plane defined by said pair of second links, said lever member has a distal portion adjacent said beam, and said tension spring means is disposed generally parallel to said beam.

17. The invention as in claim 11 wherein said tension spring means is disposed generally parallel to said beam and one end of said tension spring means is attached to said beam.

18. The invention as in claim 11 wherein said tension spring means is attached at one end to said beam.

19. The invention as in claim 18 wherein said tension spring means is a pair of tension springs disposed one on each side of said beam.

20. The invention as in claim 11 wherein said support structure is rigidly connected to said vertical link means.

21. The invention as in claim 20 wherein said beam is positioned between the plane defined by said pair of first links and the plane defined by said pair of second links, said lever member having a distal portion adjacent said beam, and said tension spring means is disposed generally parallel to said beam and one end of said tension spring means is attached to said beam.

22. The invention as in claim 11 wherein said ground-engaging means comprises at least one ground-engaging wheel.

23. The invention as in claim 11 wherein said tension spring means comprises an adjustment means for adjusting the tension of said spring means.

24. The invention as in claim 23 wherein said adjustment means comprises a connector member which is secured to said tension spring means and an adjustment bolt which adjustably engages said connector member and is removably attached to said linkage system.

* * * * *

UNITED STATES PATENT AND TRADEMARK OFFICE
CERTIFICATE OF CORRECTION

PATENT NO. : 4,974,683

DATED : December 4, 1990

INVENTOR(S) : John Hanig, et al.

It is certified that error appears in the above-identified patent and that said Letters Patent is hereby corrected as shown below:

Page 1, under Inventors, "Dougherty" should be --of Dougherty--

Page 1, under Inventors, after "Tuttle", insert --of Sheffield--

Page 1, under References Cited after 3,362,361 delete "1/1966" and insert --1/1968--

Page 1, under References Cited, "3,749,357" should be --3,749,035--

Page 1, under References Cited, "Clayton" should be --Cayton--

Page 1, under References Cited, "3,845,035" should be --3,845,730--

Page 1, under Other Publications, first line, after "Jan." insert --4,--

Page 1, under Other Publications, delete the last entry "Article entitled 'New John Deere 720 Ridge Till Attachment' from the Iowa Farmer Today" since this reference was not cited during the prosecution of this application and appears to be a combination of the first two entries under Other Publications

UNITED STATES PATENT AND TRADEMARK OFFICE
CERTIFICATE OF CORRECTION

PATENT NO. : 4,974,683

DATED : December 4, 1990

INVENTOR(S) : John Hanig, et al.

It is certified that error appears in the above-identified patent and that said Letters Patent is hereby corrected as shown below:

Page 2, under Other Publications, Col. 2, line 29, after "International Planters" insert --(Maybe Others)--

Col. 3, line 42, "deVice" should be --device--

Col. 6, line 31, ";" should be --:--

Col. 6, line 45, after "said" insert --support--

Signed and Sealed this

Fourth Day of August, 1992

Attest:

DOUGLAS B. COMER

*Attesting Officer*      *Acting Commissioner of Patents and Trademarks*